US011098194B2

(12) United States Patent
Aepli et al.

(10) Patent No.: US 11,098,194 B2
(45) Date of Patent: Aug. 24, 2021

(54) GLASS FILLER-REINFORCED POLYAMIDE MOULDING COMPOUNDS BASED ON AMORPHOUS COPOLYAMIDES

(71) Applicant: EMS-PATENT AG, Domat/Ems (CH)

(72) Inventors: Etienne Aepli, Domat/Ems (CH); Botho Hoffmann, Domat/Ems (CH)

(73) Assignee: EMS-Patent AG, Domat/Ems (CH)

( * ) Notice: Subject to any disclaimer, the term of this patent is extended or adjusted under 35 U.S.C. 154(b) by 133 days.

(21) Appl. No.: 15/729,321

(22) Filed: Oct. 10, 2017

(65) Prior Publication Data
US 2018/0100064 A1   Apr. 12, 2018

(30) Foreign Application Priority Data

Oct. 12, 2016   (EP) .................................... 16193590

(51) Int. Cl.
*C08L 77/06* (2006.01)
*C08K 7/14* (2006.01)
*C08K 5/526* (2006.01)
*C08L 77/02* (2006.01)
*C08K 5/20* (2006.01)

(52) U.S. Cl.
CPC ................ *C08L 77/06* (2013.01); *C08K 5/20* (2013.01); *C08K 5/526* (2013.01); *C08K 7/14* (2013.01); *C08L 77/02* (2013.01); *C08L 2205/025* (2013.01)

(58) Field of Classification Search
CPC ............ C08L 77/06; C08L 77/02; C08K 7/14
See application file for complete search history.

(56) References Cited

U.S. PATENT DOCUMENTS

| 8,383,244 | B2 | 2/2013 | Bayer et al. |
| 8,604,120 | B2 | 12/2013 | Stöppelmann et al. |
| 9,133,322 | B2 | 9/2015 | Roth et al. |
| 9,644,081 | B2 | 5/2017 | Aepli et al. |
| 9,663,655 | B2 | 5/2017 | Aepli et al. |
| 2010/0279111 | A1* | 11/2010 | Philipp .................... C08J 5/043 428/357 |
| 2011/0040023 | A1* | 2/2011 | Buhler .................... B29C 48/05 524/538 |
| 2012/0029133 | A1 | 2/2012 | Stöppelmann et al. |
| 2012/0321829 | A1 | 12/2012 | Bayer et al. |
| 2013/0317168 | A1* | 11/2013 | Buhler .................... C08L 77/06 524/607 |
| 2014/0094548 | A1 | 4/2014 | Roth et al. |
| 2014/0171573 | A1 | 6/2014 | Bayer et al. |
| 2015/0218374 | A1 | 8/2015 | Thomas et al. |
| 2015/0274968 | A1* | 10/2015 | Bayer ..................... C08L 77/06 523/437 |
| 2015/0284531 | A1 | 10/2015 | Aepli et al. |
| 2015/0291795 | A1 | 10/2015 | Aepli et al. |
| 2015/0352765 | A1 | 12/2015 | Hoffmann et al. |
| 2016/0130439 | A1 | 5/2016 | Koch et al. |
| 2016/0280914 | A1 | 9/2016 | Thomas et al. |
| 2016/0369098 | A1 | 12/2016 | Yasuda et al. |

FOREIGN PATENT DOCUMENTS

| EP | 2 169 008 A1 | 3/2010 |
| WO | WO 2006/089663 A1 | 8/2006 |
| WO | WO 2015/132510 A1 | 9/2015 |

OTHER PUBLICATIONS

U.S. Appl. No. 12/743,097, filed Nov. 12, 2008.
U.S. Appl. No. 13/045,682, filed Mar. 11, 2011.
U.S. Appl. No. 13/186,785, filed Jul. 20, 2011.
U.S. Appl. No. 13/481,451, filed May 25, 2012.
U.S. Appl. No. 13/800,102, filed Mar. 13, 2013.
U.S. Appl. No. 13/898,099, filed May 20, 2013.
U.S. Appl. No. 13/971,376, filed Aug. 20, 2013.
U.S. Appl. No. 15/105,011, filed Dec. 20, 2013.
U.S. Appl. No. 14/205,667, filed Mar. 12, 2014.
U.S. Appl. No. 14/915,031, filed Aug. 8, 2014.
U.S. Appl. No. 14/607,676, filed Jan. 28, 2015.
U.S. Appl. No. 15/546,373, filed Feb. 13, 2015.
U.S. Appl. No. 14/915,031, filed Feb. 26, 2015.
U.S. Appl. No. 14/663,105, filed Mar. 19, 2015.
U.S. Appl. No. 14/681,669, filed Apr. 8, 2015.
U.S. Appl. No. 14/729,277, filed Jun. 3, 2015.
U.S. Appl. No. 14/740,736, filed Jun. 16, 2015.
U.S. Appl. No. 14/935,642, filed Nov. 9, 2015.
U.S. Appl. No. 15/253,506, filed Aug. 31, 2016.
U.S. Appl. No. 15/285,947, filed Oct. 5, 2016.
U.S. Appl. No. 15/385,432, filed Dec. 20, 2016.
U.S. Appl. No. 15/385,519, filed Dec. 20, 2016.
U.S. Appl. No. 15/789,069, filed Oct. 20, 2017.

* cited by examiner

*Primary Examiner* — Monique R Peets
(74) *Attorney, Agent, or Firm* — Leydig, Voit & Mayer, Ltd.

(57) ABSTRACT

The invention relates to polyamide moulding compounds comprising the following components: a) 50 to 95% by weight of a single amorphous copolyamide constructed from monomers a1) to a6), b) 5 to 50% by weight of at least one glass filler, c) 0 to 15% by weight of at least one monomeric lactam and/or polyamide 12, d) 0 to 19% by weight of additives, the sum of components a) to d) producing 100% by weight. Furthermore, the invention relates to moulded articles made of this polyamide moulding compound.

19 Claims, No Drawings

GLASS FILLER-REINFORCED POLYAMIDE MOULDING COMPOUNDS BASED ON AMORPHOUS COPOLYAMIDES

CROSS-REFERENCE TO RELATED APPLICATION

This patent application claims the benefit of European Patent Application No. 16 193 590.3, filed on Oct. 12, 2016, the disclosure of which is incorporated herein by reference in its entirety for all purposes.

BACKGROUND OF THE INVENTION

The present invention relates to polyamide moulding compounds which are reinforced with a glass filler and have a low haze, and to moulded articles made of these polyamide moulding compounds. These polyamide moulding compounds are based on amorphous copolyamides, precisely one amorphous copolyamide being contained in a polyamide moulding compound.

For many applications of plastic material moulding compounds, in addition to very good mechanical properties, also very good optical properties are required. In order to improve the mechanical characteristic values of a plastic material moulding compound, glass fillers have been successful in particular. Achieving very good optical properties in plastic material moulding compounds reinforced with a glass filler still represents a great challenge.

WO 2006/089663 A1 relates to a plastic material composite, at least comprising a transparent plastic material and glass, the difference in refractive indices of the plastic material and of the glass, in the wavelength range of 400 to 700 nm, being at most 0.006. In particular polycarbonates are used as plastic materials.

EP 2 169 008 A1 describes amorphous polyamide resin compositions comprising a resin, comprising an amorphous polyamide resin and a glass filler, which is composed as follows: 68 to 74% by weight of silicon dioxide, 2 to 5% by weight of aluminium oxide, 2 to 5% by weight of boron oxide, 2 to 10% by weight of calcium oxide, 0 to 5% by weight of zinc oxide, 0 to 5% by weight of strontium oxide, 0 to 1% by weight of barium oxide, 1 to 5% by weight of magnesium oxide, 0 to 5% by weight of lithium oxide, 5 to 12% by weight of sodium oxide and 0 to 10% by weight of potassium oxide, the total quantity of lithium oxide, sodium oxide and potassium oxide being 8 to 12% by weight.

WO 2015/132510 A1 relates to the use of at least one partially crystalline polyamide in an amorphous polyamide resin which is reinforced with a glass filler in order to obtain a polyamide composition which has a higher transparency than the previously mentioned resin. Furthermore, transparent polyamide compositions are described, which comprise between 5 and 40% by weight of a partially crystalline polyamide, 20 to 80% by weight of at least one amorphous, transparent and at least partially cycloaliphatic polyamide, 5 to 40% by weight of glass filler and optionally 0 to 5% by weight of PEBA.

The moulding compounds known from the state of the art achieve the sought optical properties by means of complex adjustment of the refractive index of the glass filler or by admixing a partially crystalline polyamide, and allow only small variations in the selection of glass filler or require the necessary use of a partially crystalline polyamide in the moulding compound.

BRIEF SUMMARY OF THE INVENTION

The object which emerges therefrom for the present invention is to provide a moulding compound which has very good mechanical and optical properties, in particular a low haze. A partial object resides, in addition, also in enabling high flexibility with respect to the choice of the glass filler. Furthermore, the addition of partially crystalline polyamides is intended in fact to be possible but not obligatory, in order to achieve the desired optical properties.

This object is achieved by the features of the polyamide moulding compound and by the moulded articles described herein, and the advantageous developments thereof.

DETAILED DESCRIPTION OF THE INVENTION

According to the invention, a polyamide moulding compound which comprises the following components is provided:

a) 50 to 95% by weight of a single amorphous copolyamide, constructed from the following monomers,
   a1) 0.1 to 47.9% by mol of at least one diamine selected from the group consisting of bis(4-amino-3-methylcyclohexyl)methane, bis(4-aminocyclohexyl) methane, bis(4-amino-3-ethylcyclohexyl)methane, bis(4-amino-3,5-dimethylcyclohexyl)methane, 2,2-bis(p-aminocyclohexyl) propane, 1,3-bis(aminomethyl)cyclohexane, 1,4-bis(aminomethyl)cyclohexane, 1,3-diaminocyclohexane, 1,4-diaminocyclohexane, bis(4-amino-2,3-dimethylcyclohexyl) methane, isophorone diamine, 1,6-diamino-2,2,4-trimethylhexane, 1,6-diamino-2,4,4-trimethylhexane, 2,5-bis(aminomethyl) norbornane, 2,6-bis(aminomethyl)norbornane, 2,5-diaminonorbornane, 2,6-diaminonorbornane and mixtures hereof,
   a2) 0.1 to 40% by mol of 1,6-hexanediamine,
   a3) 9 to 48% by mol of isophthalic acid,
   a4) 0 to 24% by mol of terephthalic acid,
   a5) 4 to 35% by mol of laurinlactam,
   a6) 0 to 30% by mol of a1) to a5) of various further monomers, the molar content of isophthalic acid a3) being at least equal to the content of terephthalic acid a4), and
   the sum of the monomers a1) to a6) producing 100% by mol, and the sum of all the diamine monomers corresponding essentially to the sum of all the dicarboxylic acid monomers,
b) 5 to 50% by weight of at least one glass filler,
c) 0 to 15% by weight of at least one monomeric lactam and/or polyamide 12,
d) 0 to 19% by weight of additives,
the sum of components a) to d) producing 100% by weight.

Surprisingly, it was found that polyamide moulding compounds according to the above definition, which comprise a single amorphous copolyamide, have a significantly improved haze relative to polyamide moulding compounds which have, with respect to type and quantity of components a) to d) and optional further components, no differences relative to the 1$^{st}$ polyamide moulding compound, but differ in the fact that monomers a1) to a6) do not exactly form a copolyamide but rather a blend of one or more polyamides and/or of one or more copolyamides formed from these monomers is present.

In the sense of the present invention, there is understood by the term "polyamide" (abbreviation PA), a generic term, the latter comprises homopolyamides and copolyamides. The selected spellings and abbreviations for polyamides and the monomers thereof correspond to those established in the ISO standard 1874-1:2010 (D). The abbreviations used therein are used in the following synonym for the IUPAC names of the monomers, in particular the following abbreviations for monomers occur, MACM for bis(4-amino-3-methylcyclohexyl)methane (also termed 3,3'-dimethyl-4,4'-diaminodicyclohexylmethane, CAS No. 6864-37-5), PACM for bis(4-aminocyclohexyl)methane (also termed 4,4'-diaminodicyclohexylmethane, CAS No. 1761-71-3), EACM for bis(4-amino-3-ethylcyclohexyl) methane (also termed 3,3'-diethyl-4,4'-diaminodicyclohexylmethane, CAS No. 1064114-65-3), TMDC for bis(4-amino-3,5-dimethylcyclohexyl)methane (also termed 3,3',5,5'-tetramethyl-4,4'-diaminodicyclohexylmethane, CAS No. 65962-45-0), PACP for 2,2-bis(p-aminocyclohexyl)propane (CAS No. 3377-24-0), MC for 1,3-bis(aminomethyl)cyclohexane (CAS No. 2579-20-6), T for terephthalic acid (CAS No. 100-21-0), I for isophthalic acid (CAS No. 121-95-5), 6 for 1,6-hexanediamine (CAS No. 124-09-4) and 12 for laurinlactam (CAS. No. 947-04-6).

According to the present invention, component a) represents "a single" copolyamide which can be constructed from monomers a1) to a6), monomers a1), a2), a3) and a5) being necessarily present, and which copolyamide comprises no monomers different from a1) to a6). The 1st proviso applies thereby that the sum of monomers a1) to a6) produces 100% by mol. The prescribed ranges of the quantity data for the individual monomers a1) to a6) should be understood such that, within the prescribed ranges, an arbitrary quantity for each of the individual components can be selected provided the strict proviso is fulfilled that the sum of all the monomers a1) to a6) produces 100% by mol.

As $2^{nd}$ proviso, it applies that the sum of all the diamine monomers corresponds "substantially" to the sum of all the dicarboxylic acid monomers. The term "substantially" thereby allows excesses of diamine monomers or of dicarboxylic acid monomers of at most 3%, preferably at most 2% and particularly preferably at most 1%. A 3% excess of dicarboxylic acid thereby means for example that the molar ratio of dicarboxylic acids to diamines is 1.03:1.

Furthermore, there applies as $3^{rd}$ proviso that the molar content of isophthalic acid a3) is at least equal to the content of terephthalic acid a4).

The quantity data with respect to monomers a1) to a6) should thereby be understood such that a corresponding molar ratio of these monomers used in the polycondensation is also found again in the copolyamides produced by polycondensation.

The copolyamides according to the invention comprise, in addition to dicarboxylic acid and diamines, also lactams at X % by mol, therefore the sum of all the diamines is still only (50−0.5 X) % by mol and the sum of all the dicarboxylic acids (50−0.5 X) % by mol, relative to 100% by mol of copolyamide.

The polyamide moulding compounds according to the present invention comprise components a) to d), the proviso thereby applies that components a) to d) add up in total to 100% by weight. The prescribed ranges of the quantity data for the individual components a) to d) should be understood such that, within the prescribed ranges, an arbitrary quantity for each of the individual components can be chosen, provided the strict proviso is fulfilled that the sum of all the components a) to d) produces 100% by weight.

"Haze" describes the scattering behaviour of a material, there is understood, within the scope of the invention, by "haze", the "haze" measured according to ASTM D1003 on a moulded article produced from the polyamide moulding compound (2 mm thick plates with width and length: 60×60 mm).

There is understood by "light transmission", in the sense of the present invention, the light transmission measured according to ASTM D1003 on a moulded article produced from the polyamide moulding compound (2 mm thick plates with width and length: 60×60 mm).

Component a):
The polyamide moulding compound according to the present invention comprises as component a) 50 to 95% by weight of a single amorphous copolyamide. These quantity data are relative to the total mass of the polyamide moulding compound.

According to a preferred embodiment of the present invention, the polyamide moulding compound comprises component a) in 55 to 89.8% by weight, preferably 65 to 82.5% by weight and particularly preferably 70 to 78% by weight, relative to the total mass of the polyamide moulding compound.

In the case of the amorphous copolyamide a), a copolyamide is preferred which, with respect to the melting heat, has a melting heat, determined according to ISO 11357, of at most 5 J/g, preferably of at most 3 J/g and particularly preferably of 0 to 1 J/g.

The glass transition temperature of the amorphous copolyamide a) measured according to ISO 11357, is preferably 110 to 220° C., particularly preferably 130 to 200° C., even more preferably 140 to 185° C.

The relative viscosity of the amorphous copolyamide a) measured according to ISO 307, with 0.5 g of polymer in 100 ml of m-cresol at 20° C., is preferably 1.40 to 2.2, preferably 1.45 to 2.0, particularly preferably 1.50 to 1.90 and very particularly preferably 1.55 to 1.85.

Adjustment of the relative viscosity and hence of the molar mass can be effected in a manner known per se, e.g. via monofunctional amines or carboxylic acids, and/or difunctional diamines or dicarboxylic acids as chain regulators. Preferred monofunctional chain regulators for the copolyamides according to the invention are benzoic acid, acetic acid, propionic acid, butyric acid, valeric acid, caproic acid, lauric acid, stearic acid, 2-ethylhexanoic acid, cyclohexanoic acid, propylamine, butylamine, pentylamine, hexylamine, 2-ethylhexylamine, n-octylamine, n-nonylamine, n-dodecylamine, n-tetradecylamine, n-hexadecylamine, stearylamine, cyclohexylamine, 3-(cyclohexylamino)propylamine, methylcyclohexylamine, dimethylcyclohexylamine, benzylamine, 2-phenylethylamine, aniline or triacetonediamine. The chain regulators can be used individually or in combination. Also other monofunctional compounds, which can react with an amino or acid group, can be used as chain regulators, such as anhydrides, isocyanates, acid halogenides or esters. The normal quantity of use of the monofunctional chain regulators is between 10 and 200 mmol per kg of copolyamide.

The amorphous copolyamide a) can be constructed from monomers a1) to a6). Monomers a1) to a3) and also a5) must thereby be contained and copolyamide a) comprises no monomers different from a1) to a6).

Monomer a1) is a diamine selected from the group consisting of bis(4-amino-3-methylcyclohexyl) methane, bis(4-aminocyclohexyl)methane, bis(4-amino-3-ethylcyclohexyl) methane, bis(4-amino-3,5-dimethylcyclohexyl)methane, 2,2-bis(p-aminocyclohexyl)propane and 1,3-bis(aminomethyl)cyclohexane, 1,4-bis(aminomethyl)cyclohexane, 1,3-diaminocyclohexane, 1,4-diaminocyclohexane, bis(4-amino-2,3-dimethylcyclohexyl) methane, isophorone diamine, 1,6-diamino-2,2,4-trimethylhexane, 1,6-diamino-2,4,4-trimethylhexane, 2,5-bis(aminomethyl)norbornane, 2,6-bis(aminomethyl) norbornane, 2,5-diaminonorbornane, 2,6-diaminonorbornane and mixtures hereof.

The proportion of monomer a1) in copolyamide a) is thereby 0.1 to 47.9% by mol. The preferred ranges for the proportion of monomer a1) in copolyamide a) depend upon the chosen diamine or the chosen diamines a1) and also upon the remaining monomers contained in copolyamide a) and are for example 5 to 44.5% by mol, 18.5 to 39% by mol, 22 to 31% by mol, 22 to 30% by mol, 22 to 29% by mol or 24 to 29% by mol.

Monomer a2) is 1,6-hexanediamine, which is contained in copolyamide a) in 0.1 to 40% by mol. The preferred ranges for the proportion of monomer a2) in copolyamide a) depend upon the remaining monomers contained in copolyamide a) and are for example 0.5 to 30% by mol, 5 to 22% by mol, 9 to 20% by mol, 11 to 22% by mol, 12 to 20% by mol or 11 to 17% by mol.

Monomer a3) is isophthalic acid, which is contained in copolyamide a) in 0.9 to 48% by mol. The preferred ranges for the proportion of monomer a3) in copolyamide a) depend upon the remaining monomers contained in copolyamide a) and are for example 16 to 45% by mol, 20.25 to 44% by mol, 22 to 26% by mol, 22 to 25% by mol, 20.25 to 21.75% by mol or 20.5 to 21.5% by mol.

Monomer a4) is terephthalic acid, which can be contained optionally in copolyamide a), the maximum proportion being at 24% by mol. The preferred ranges for the proportion of monomer a4) in copolyamide a) depend upon the remaining monomers contained in copolyamide a) and are for example 0 to 22.5% by mol, 0 to 22% by mol, 20.25 to 21.75% by mol, 20.5 to 21.5% by mol or 18 to 19% by mol.

Monomer a5) is laurinlactam, which is contained in copolyamide a) in 4 to 35% by mol. The preferred ranges for the proportion of monomer a5) in copolyamide a) depend upon the remaining monomers contained in copolyamide a) and are for example 10 to 20% by mol, 12 to 19% by mol, 13 to 19% by mol or 14 to 18% by mol.

Monomer a6) represents a monomer which is different from monomers a1) to a5) and is contained optionally in copolyamide a), the maximum proportion thereof being at 30% by mol. The further monomer a6) is preferably selected from the group consisting of meta-xylylenediamine, para-xylylenediamine, linear or branched aliphatic diamines with 6 to 22 carbon atoms, linear or branched aliphatic dicarboxylic acids with 4 to 22 carbon atoms, cycloaliphatic dicarboxylic acids with 6 to 22 carbon atoms, naphthalenedicarboxylic acid, dimeric fatty acids with 36, 44 or 54 carbon atoms, lactams with 4 to 11 carbon atoms or lactams with 13 to 15 carbon atoms, ω-amino acids with 4 to 15 carbon atoms and mixtures thereof. The preferred ranges for the proportion of monomer a6) in copolyamide a) depend upon the type of monomer a6) chosen and also the remaining monomers contained in copolyamide a) and are for example 0 to 15% by mol.

For particular preference, the further monomer a6) is selected from the group consisting of meta-xylylenediamine, para-xylylenediamine, 1,9-nonanediamine, 1,10-decanediamine, 1,12-dodecanediamine, 1,14-tetradecanediamine, 1,18-octadecanediamine, 1,9-nonanedioic acid, 1,10-decanedioic acid, 1,12-dodecanedioic acid, 1,14-tetradecanedioic acid, 1,18-octadecanedioic acid, 2,6-naphthalenedicarboxylic acid, 1,3-cyclohexanedicarboxylic acid, 1,4-cyclohexanedicarboxylic acid, phenylindanedicarboxylic acid, phenylene dioxydiacetic acid, dimeric fatty acid with 36 or 44 C atoms, caprolactam, ω-amino acids with 6 or 11 carbon atoms and mixtures thereof.

For very particular preference, the further monomer a6) is selected from the group consisting of 1,10-decanediamine, 1,12-dodecanediamine, 1,14-tetradecanediamine, 1,18-octadecanediamine, 1,10-decanedioic acid, 1,12-dodecanedioic acid, 1,14-tetradecanedioic acid, 1,18-octadecanedioic acid, 1,3-cyclohexanedicarboxylic acid and mixtures thereof.

A preferred copolyamide a) according to the present invention is constructed from the following monomers:
a1) 5 to 44.5% by mol of at least one diamine selected from the group consisting of bis(4-amino-3-methylcyclohexyl) methane, bis(4-aminocyclohexyl) methane, bis(4-amino-3-ethylcyclohexyl)methane, bis(4-amino-3,5-dimethylcyclohexyl)methane, 2,2-bis(p-aminocyclohexyl)propane and mixtures hereof,
a2) 0.5 to 30% by mol of 1,6-hexanediamine,
a3) 16 to 45% by mol of isophthalic acid,
a4) 0 to 22.5% by mol of terephthalic acid,
a5) 10 to 20% by mol of laurinlactam,
a6) 0 to 15% by mol of a1) to a5) of different further monomers,
the molar content of isophthalic acid a3) being at least equal to the content of terephthalic acid a4), and the sum of monomers a1) to a6) producing 100% by mol, and the sum of all the diamine monomers corresponding essentially to the sum of all the dicarboxylic acid monomers.

A further preferred copolyamide a) according to the present invention is constructed from the following monomers:
a1) 18.5 to 39% by mol of at least one diamine selected from the group consisting of bis(4-amino-3-methylcyclohexyl) methane, bis(4-aminocyclohexyl) methane, bis(4-amino-3,5-dimethylcyclohexyl)methane and mixtures hereof,
a2) 5 to 22% by mol of 1,6-hexanediamine
a3) 20.25 to 44% by mol of isophthalic acid,
a4) 0 to 22% by mol of terephthalic acid,
a5) 12 to 19% by mol of laurinlactam,
the molar content of isophthalic acid a3) being at least equal to the content of terephthalic acid a4), and the sum of monomers a1) to a5) producing 100% by mol, and the sum of all the diamine monomers corresponding essentially to the sum of all the dicarboxylic acid monomers.

A particularly preferred copolyamide a) according to the present invention is constructed from the following monomers:
a1) 22 to 31% by mol of bis(4-amino-3-methylcyclohexyl) methane and 0.1 to 2.0% by mol of bis(4-aminocyclohexyl)methane,
a2) 9 to 20% by mol of 1,6-hexanediamine,
a3) 20.25 to 21.75% by mol of isophthalic acid,
a4) 20.25 to 21.75% by mol of terephthalic acid,
a5) 13 to 19% by mol of laurinlactam,
the molar content of isophthalic acid a3) being at least equal to the content of terephthalic acid a4), and the sum of monomers a1) to a5) producing 100% by mol, and the sum of all the diamine monomers corresponding essentially to the sum of all the dicarboxylic acid monomers.

A further particularly preferred copolyamide a) according to the present invention is constructed from the following monomers:
a1) 24 to 29% by mol of bis(4-amino-3-methylcyclohexyl) methane and 0.5 to 1.5% by mol of bis(4-aminocyclohexyl)methane,
a2) 11 to 17% by mol of 1,6-hexanediamine,
a3) 20.5 to 21.5% by mol of isophthalic acid,
a4) 20.5 to 21.5% by mol of terephthalic acid,
a5) 14 to 18% by mol of laurinlactam,
the molar content of isophthalic acid a3) being at least equal to the content of terephthalic acid a4), and the sum of monomers a1) to a5) producing 100% by mol, and the sum of all the diamine monomers corresponding essentially to the sum of all the dicarboxylic acid monomers.

Another particularly preferred copolyamide a) according to the present invention is constructed from the following monomers:
a1) 22 to 30% by mol of bis(4-amino-3-methylcyclohexyl)methane,
a2) 11 to 22% by mol of 1,6-hexanediamine,
a3) 22 to 26% by mol of isophthalic acid,
a4) 18 to 19% by mol of terephthalic acid,
a5) 13 to 19% by mol of laurinlactam,
the sum of monomers a1) to a5) producing 100% by mol, and the sum of all the diamine monomers corresponding essentially to the sum of all the dicarboxylic acid monomers.

A further particularly preferred copolyamide a) according to the present invention is constructed from the following monomers:
a1) 22 to 29% by mol of bis(4-amino-3-methylcyclohexyl)methane,
a2) 12 to 20% by mol of 1,6-hexanediamine,
a3) 22 to 25% by mol of isophthalic acid,
a4) 18 to 19% by mol of terephthalic acid,
a5) 14 to 18% by mol of laurinlactam,
the sum of monomers a1) to a5) producing 100% by mol, and the sum of all the diamine monomers corresponding essentially to the sum of all the dicarboxylic acid monomers.

The amorphous copolyamide a) shows no melting point in the DSC measurement according to ISO 11357, because of the amorphicity thereof.

Component b):

The polyamide moulding compound according to the invention comprises, as component (b), at least one glass filler.

The glass filler (b) is contained with 5 to 50% by weight, preferably at 10 to 40% by weight and particularly preferably at 15 to 30% by weight, these quantity data relating to the total mass of the polyamide moulding compound.

For the glass filler (b), basically any glass composition can be selected according to the present invention.

The glass filler is selected preferably from the group consisting of fibres, ground fibres, particles, flakes, balls, hollow balls and mixtures hereof, preferably consisting of fibres, particles, flakes and mixtures thereof.

The glass filler can be surface-treated. This can take place with a suitable size- or adhesive system. For this purpose, for example systems based on fatty acids, waxes, silanes, titanates, polyamides, urethanes, polyhydroxyethers, epoxides, nickel, respectively combinations or mixtures thereof can be used. Preferably, the glass filler is surface-treated with aminosilanes, epoxysilanes, polyamides or mixtures thereof.

If fibres are selected as filler for component (b), then the glass fibres are selected from the group consisting of cut fibres, endless fibres and mixtures thereof, the fibres having a cross-section which is round, oval, elliptical, square or rectangular.

The appearance of the glass fibres can be stretched or spiral.

The cut glass fibres preferably have a fibre length of 1 to 25 mm, preferably 1.5 to 20 mm, particularly preferably 2 to 12 mm and very particularly preferably of 2 to 8 mm.

The cut glass fibres preferably have a diameter 5 to 20 μm, preferably of 5 to 15 μm and particularly preferably of 6 to 12 μm.

If the glass fibres are used as endless fibres (rovings), they preferably have a diameter of at most 20 μm, preferably of at most 18 μm, particularly preferably of 5 to 14 μm.

In the case of flat glass fibres, the aspect ratio, i.e. the ratio of the main cross-sectional axis to the subsidiary cross-sectional axis, is 1.5 to 8, preferably 2 to 6, particularly preferably 3 to 5.

The cross-sectional axes of the flat glass fibres are 3 to 40 μm long. Preferably, the length of the subsidiary cross-sectional axis is 3 to 20 μm, particularly preferably 4 to 10 μm and the length of the main cross-sectional axis is 6 to 40 μm, particularly preferably 12 to 30 μm.

For reinforcement of the polyamide moulding compounds according to the invention, also mixtures of fibres with circular (round) and non-circular (flat) cross-section can be used.

The glass fibres can be selected, irrespective of length, diameter or the shape of the cross-sectional area, from the normal types of glass fibre, i.e. A-glass, C-glass, D-glass, E-glass, ECR-glass, M-glass, R-glass, S-glass, T-glass and mixtures thereof.

If glass balls or glass particles are selected as glass filler b), the average volumetric diameter ($d_{50}$) thereof is 0.3 to 100 μm, preferably 5 to 80 μm, particularly preferably 17 to 70 μm, measured by means of laser diffraction according to ASTM B 822.

Component c):

The polyamide moulding compound can optionally comprise from 0 to 15% by weight of at least one monomeric lactam and/or polyamide 12, relative to the total weight of the polyamide moulding compound.

According to one embodiment of the present invention, the proportion of component c) in the polyamide moulding compound is in the range of 0.1 to 10% by weight, preferably 2 to 9% by weight and particularly preferably 3 to 7% by weight, relative to the total weight of the polyamide moulding compound.

According to a further embodiment of the present invention, the at least one monomeric lactam according to component c) is caprolactam or laurinlactam.

According to another embodiment of the present invention, the polyamide moulding compound comprises 0.1 to 10% by weight, preferably 0.5 to 6% by weight and particularly preferably 1.5 to 4% by weight, relative to the total weight of the polyamide moulding compound, of laurinlactam in monomeric form as component c).

According to a further embodiment of the present invention, the polyamide moulding compound comprises 0.1 to 10% by weight, preferably 1.5 to 6% by weight and particularly preferably 2 to 4.5% by weight, relative to the total weight of the polyamide moulding compound, of polyamide 12 as component c).

According to a preferred embodiment of the present invention, the polyamide moulding compound comprises no polyamide 12 as component c).

Component d):

The polyamide moulding compound can optionally comprise 0 to 19% by weight of additives. The additives can be contained preferably in a content of 0.1 to 15% by weight, particularly preferably of 0.3 bis 6% by weight, furthermore preferably of 0.5 bis 4% by weight, these quantity data relating to the total weight of the polyamide moulding compound.

As additive (d), those substances which impair the optical properties of the polyamide moulding compound as little as possible are used preferably in the polyamide moulding compound according to the invention. Preferably, these additives are selected from the group consisting of inorganic and organic stabilisers, in particular antioxidants, antiozonants, light protection agents, UV stabilisers, UV absorbers or UV blockers, lubricants, colourants, marking means, pigments, carbon black, graphite, photochromic agents, antistatic agents, mould-release agents, condensation catalysts, chain regulators, defoamers, antiblocking means, optical brighteners, halogen-containing flame retardants, halogen-free flame retardants, natural layer silicates, synthetic layer silicates, metallic pigments, metal flakes, metal-coated particles, fillers, nanoscale fillers with a particle size of at most 100 nm and mixtures thereof.

The additives d) can be added during production of the copolyamide according to the invention and/or during production of the polyamide moulding compound according to the invention. Additives, such as chain regulators, defoamers or condensation catalysts, are added, corresponding to the purpose thereof, preferably already during production of the copolyamide. Whereas, it is preferred to add additives, such as inorganic and organic stabilisers, in particular antiozonants, light protection agents, UV stabilisers, UV absorbers or UV blockers, lubricants, colourants, marking means, pigments, photochromic agents, antistatic agents, mould-release agents, antiblocking means, optical brighteners, halogen-containing flame retardants, halogen-free flame retardants, natural layer silicates, synthetic layer silicates, fillers, nanoscale fillers with a particle size of at most 100 nm, only during production of the polyamide moulding compound. Antioxidants however are added preferably during both productions, that of the copolyamide according to the invention and that of the polyamide moulding compound according to the invention.

Particularly preferably, these additives are selected from the group consisting of inorganic and organic stabilisers, in particular antioxidants, antiozonants, light protection agents, UV stabilisers, UV absorbers or UV blockers, lubricants, colourants, marking means, pigments, photochromic agents, antistatic agents, mould-release agents, condensation catalysts, chain regulators, defoamers, antiblocking means, optical brighteners, halogen-containing flame retardants, halogen-free flame retardants, natural layer silicates, synthetic layer silicates, fillers, nanoscale fillers with a particle size of at most 100 nm and mixtures thereof.

Very particularly preferred, these additives are selected from the group consisting of inorganic and organic stabilisers, in particular antioxidants, antiozonants, light protection agents, UV stabilisers, UV absorbers or UV blockers, lubricants, colourants, marking means, mould-release agents, condensation catalysts, chain regulators, defoamers, optical brighteners and mixtures thereof.

Particularly preferred organic stabilisers comprise sterically hindered phenols, such as for example N,N'-hexane-1,6-diylbis(3-(3,5-di-tert.-butyl-4-hydroxyphenylpropionamides)) and hindered aryl phosphites, such as for example tris(2,4-di-tert-butylphenyl)phosphites.

Polyamide Moulding Compound

According to a preferred embodiment of the present invention, the polyamide moulding compound consists only of the above-defined components a) to d).

According to a further preferred embodiment of the present invention, the polyamide moulding compound comprises no aliphatic polyamide not even as carrier material of a master batch.

According to a further preferred embodiment of the present invention, the haze of the polyamide moulding compound, which is measured according to ASTM D1003 on a moulded article produced from the polyamide moulding compound (2 mm thick plates with width and length: 60×60 mm), is lower by at least 15%, preferably at least 20% and particularly preferably by 30%, than the haze of a further polyamide moulding compound which, with respect to type and quantity of components a) to d) and optional further components, has no differences relative to the $1^{st}$ polyamide moulding compound, but differs in that the monomers a1) to a6) do not exactly form a single copolyamide but rather a blend of one or more polyamides and/or of one or more copolyamides formed from these monomers is present.

According to another preferred embodiment of the present invention, the haze, which is measured according to ASTM D1003 on a moulded article produced from the polyamide moulding compound (2 mm thick plates with width and length: 60×60 mm), is at most 70%, preferably at most 50%, particularly preferably at most 40% and very particularly preferably at most 30%.

A further preferred embodiment of the present invention provides that the light transmission, which is measured according to ASTM D1003 on a moulded article produced from the polyamide moulding compound (2 mm thick plates with width and length: 60×60 mm), is at least 75%, preferably at least 80% and particularly preferably at least 85%.

According to another preferred embodiment of the present invention, the haze, which is measured according to ASTM D1003 on a moulded article produced from the polyamide moulding compound (2 mm thick plates with width and length: 60×60 mm), is at most 70%, preferably at most 50%, particularly preferably at most 40% and very particularly preferably at most 30%, and the light transmission, which is measured according to ASTM D1003 on a moulded article produced from the polyamide moulding compound (2 mm thick plates with width and length: 60×60 mm), is at least 75%, preferably at least 80% and particularly preferably at least 85%.

A preferred polyamide moulding compound according to the present invention provides that
 the proportion of component a) in the polyamide moulding compound is in the range of 55 to 89.8% by weight, preferably 65 to 82.5% by weight, and particularly preferably 70 to 78% by weight, relative to the total weight of the polyamide moulding compound, and/or
 the proportion of component b) in the polyamide moulding compound is in the range of 10 to 40% by weight, preferably 15 to 30% by weight and particularly preferably 18 to 25% by weight, relative to the total weight of the polyamide moulding compound, and/or
 the proportion of component c) in the polyamide moulding compound is in the range of 0.1 to 10% by weight, preferably 2 to 9% by weight and particularly preferably 3 to 7% by weight, relative to the total weight of the polyamide moulding compound, and/or
 the proportion of component d) in the polyamide moulding compound is in the range of 0.1 to 15% by weight, preferably 0.5 to 6% by weight and particularly preferably 1 to 4% by weight, relative to the total weight of the polyamide moulding compound.

A preferred polyamide moulding compound according to the present invention has a tearing strength, determined according to ISO 527, of at least 80 MPa, preferably at least 100 MPa and particularly preferably at least 120 MPa.

A further preferred polyamide moulding compound according to the present invention has a breaking elongation, determined according to ISO 527, of at least 1.5%, preferably at least 2.0% and particularly preferably at least 2.5%.

Another preferred polyamide moulding compound according to the present invention has a modulus of elasticity in tension, determined according to ISO 527, of at least 4,000 MPa, preferably at least 5,000 MPa and particularly preferably at least 6,000 MPa.

A further preferred polyamide moulding compound according to the present invention has a Charpy impact strength at 23° C., determined according to ISO 179/2eU, of at least 20 kJ/m$^2$, preferably at least 25 kJ/m$^2$ and particularly preferably at least 28 kJ/m$^2$.

Another preferred polyamide moulding compound according to the present invention has a Charpy notch impact strength at 23° C., determined according to ISO 179/2eA, of at least 6.0 kJ/m$^2$, preferably at least 6.5 kJ/m$^2$ and particularly preferably at least 7.2 kJ/m$^2$.

Furthermore, a preferred polyamide moulding compound according to the present invention has a tearing strength, determined according to ISO 527, of at least 80 MPa, preferably at least 100 MPa and particularly preferably at least 120 MPa and a breaking elongation, determined according to ISO 527, of at least 1.5%, preferably at least 2.0% and particularly preferably at least 2.5% and a modulus of elasticity in tension, determined according to ISO 527, of at least 4,000 MPa, preferably at least 5,000 MPa and particularly preferably at least 6,000 MPa and a Charpy impact strength at 23° C., determined according to ISO 179/2eU, of at least 20 kJ/m$^2$, preferably at least 25 kJ/m$^2$ and particularly preferably at least 28 kJ/m$^2$ and a Charpy notch impact strength at 23° C., determined according to ISO 179/2eA, of at least 6.0 kJ/m$^2$, preferably at least 6.5 kJ/m$^2$ and particularly preferably at least 7.2 kJ/m$^2$.

According to one embodiment, the polyamide moulding compound according to the invention is free of polyether block amides.

Polyamide Moulded Articles

Furthermore, the present invention relates to moulded articles, producible from a polyamide moulding compound as defined above.

These moulded articles are, according to a preferred embodiment of the present invention, selected from the group consisting of components of mobile phones, tablets, housings of electronic devices, decorative parts in vehicles and the household, covers, visible surfaces, backlit components, screens, containers, vehicle keys, leisure and outdoor articles.

The subject according to the invention is intended to be explained in more detail with reference to the subsequent examples, without wishing to restrict said subject to the specific embodiments shown here.

1. Measuring Methods

The following measuring methods were used within the scope of this application:

Relative Viscosity

The relative viscosity was determined according to ISO 307 at 20° C. For this purpose, 0.5 g of polymer granulate was weighed into 100 ml of m-cresol, calculation of the relative viscosity (RV) according to $RV=t/t_0$ was effected in accordance with section 11 of the standard.

Glass Transition Temperature (Tg), Melt Heat and Melting Point

Determination of the glass transition temperature and of the melting point was effected on granulate according to ISO 11357.

Differential Scanning calorimetry (DSC) was implemented during each of the two heatings at a heating rate of 20 K/min. After the first heating, the sample was quenched in dry ice. Glass transition temperature (Tg), melt heat and melting point were determined during the second heating.

The temperature at peak maximum was indicated as melting point. The average of the glass transition range which was indicated as glass transition temperature (Tg) was determined according to the "half height" method.

Haze and Light Transmission

The haze and light transmission were determined, according to ASTM D 1003, at 23° C. on 2 mm thick plates (width and length: 60×60 mm) on a "Haze Gard plus" of the company Byk Gardner with CIE light type C. The light transmission was indicated in % of the irradiated quantity of light.

Modulus of Elasticity in Tension

The modulus of elasticity in tension was determined, according to ISO 527, at 23° C. with a tensile speed of 1 mm/min on an ISO tensile test bar, type A1 (mass: 170×20/10×4 mm) produced according to the standard: ISO/CD 3167.

Tearing Strength and Breaking Elongation

Determination of tearing strength and breaking elongation was implemented, according to ISO 527, at 23° C. with a tensile speed of 5 mm/min on an ISO tensile test bar, type A1 (mass 170×20/10×4 mm), produced according to the standard ISO/CD 3167.

Impact Strength According to Charpy

Determination of the impact strength according to Charpy was implemented, according to ISO 179/2*eU (*2=instrumented), at 23° C. on an ISO test bar, type B1 (mass 80×10×4 mm), produced according to the standard ISO/CD 3167.

Notch Impact Strength According to Charpy

Determination of the notch impact strength according to Charpy was implemented, according to ISO 179/2*eA (*2=instrumented), at 23° C. on an ISO test bar, type B1 (mass 80×10×4 mm), produced according to the standard ISO/CD 3167.

Production of the Test Pieces

The test pieces were produced on an injection moulding machine of the company Arburg, Model Allrounder 420 C 1000-250 with a 3-zone-standard-screw with a diameter of 25 mm. Cylinder temperatures of 290/310/300° C. which increase and decrease from the feed to the nozzle were thereby used. The mould temperature was 80° C. during production of the ISO tensile test bars and ISO test bars. For production of the plates for determining haze and light transmission, a polished mould and a mould temperature of 120° C. was used.

The test pieces were used in the dry state; for this purpose, they were stored, after injection moulding, for at least 48 h at room temperature in a dry environment, i.e. over silica gel.

2. Materials Used

The monomers used in the examples are compiled in Table 1.

TABLE 1

Monomers used in the examples

| Monomer | CAS No. | Melt range [° C.] | Trade name | Manufacturer |
|---|---|---|---|---|
| 1,6-hexanediamine | 124-09-4 | 39 to 42 | — | BASF SE, Germany |
| Bis(4-amino-3-methylcyclohexyl)-methane | 6864-37-5 | −7 to −0.6* | Laromin C260 | BASF SE, Germany |
| Bis(4-amino-cyclohexyl)methane | 1761-71-3 | −16 to 46 | 4,4'-diaminodi-cyclohexylmethane | BASF SE, Germany |
| Terephthalic acid | 100-21-0 | >400 | — | CEPSA, Spain |
| Isophthalic acid | 121-91-5 | 345 to 348 | — | Flint Hills Resources, Switzerland |
| Laurinlactam | 947-04-6 | 152 | — | EMS-CHEMIE AG, Switzerland |

*Freezing range according to ASTM D1015-55.

Table 2 gives an overview of the polyamides used in the comparative examples.

TABLE 2

Polyamides used in the comparative examples.

| Components | Description | Manufacturer |
|---|---|---|
| Polyamide 1 | Amorphous polyamide MACMI/MACMT/12 in the molar ratio 38/38/24 made of bis(3-methyl-4-aminocyclohexyl)methane, isophthalic acid, terephthalic acid and laurinlactam<br>RV 1.53 (measured with 0.5 g in 100 ml of m-cresol at 20° C.)<br>Glass transition temperature 194° C.<br>Module of elasticity in tension 1,600 MPa (dry, 23° C.) | EMS-CHEMIE AG, Switzerland |
| Polyamide 2 | Amorphous polyamide 6I/6T/MACMI/MACMT/PACMI/PACMT/12 in the molar ratio 39/39/7.1/7.1/2.5/2.5/2.8 made of 1,6-hexanediamine, bis(3-methyl-4-aminocyclohexyl)methane, bis(4-aminocyclohexyl)methane, isophthalic acid, terephthalic acid and laurinlactam<br>RV 1.62 (measured with 0.5 g in 100 ml of m-cresol at 20° C.)<br>Glass transition temperature 159° C.<br>Modulus of elasticity in tension 2,800 MPa (dry, 23° C.) | EMS-CHEMIE AG, Switzerland |
| Polyamide 3 | Amorphous polyamide 6I/6T made of hexamethylenediamine, isophthalic acid and terephthalic acid<br>Molar ratio isophthalic acid: terephthalic acid 2:1<br>RV 1.54 (measured with 0.5 g in 100 ml of m-cresol at 20° C.)<br>Glass transition temperature 125° C.<br>Modulus of elasticity in tension 3,000 MPa (dry, 23° C.) | EMS-CHEMIE AG, Switzerland |

RV = relative viscosity, measured on a solution made of 0.5 g of polyamide in 100 ml of m-cresol at 20° C.

Table 3 compiles the further materials used in the examples and comparative examples.

TABLE 3

Materials used in the examples and comparative examples

| Components | Description | Trade name | Manufacturer |
|---|---|---|---|
| Polyamide 12 | Polyamide 12 made of laurinlactam<br>RV 1.58 (measured with 0.5 g in 100 ml of m-cresol at 20° C.)<br>Melting point 178° C. | — | EMS-CHEMIE AG, Switzerland |
| Laurinlactam | 12-laurinlactam<br>Melting point 152° C. | — | EMS-CHEMIE AG, Switzerland |
| Glass fibre 1 | Flat glass fibre, 3 mm long, Main cross-sectional axis 28 μm, Subsidiary cross-sectional axis 7 μm, Aspect ratio of the cross-sectional axes = 4 | Nittobo CSG3PA-820 | Nitto Boseki Co., LTD., Japan |
| Glass fibre 2 | Flat glass fibre, 3 mm long, Main cross-sectional axis 12-14 μm, Subsidiary cross-sectional axis 6-8 μm | CPIC ECS 301T-3 | Chongqing Polycomp International Corp., China |
| Glass fibre 3 | Round glass fibre, 4.5 mm long, Diameter 10 μm | Vetrotex 995 EC10-4.5 | Saint-Gobain Vetrotex, France |
| Antioxidant 1 | N,N'-hexane-1,6-diylbis[3-(3,5-di-tert-butyl-4-hydroxyphenylpropionamide | Irganox 1098 | BASF SE, Germany |
| Antioxidant 2 | Tris(2,4-ditert-butylphenyl)phosphite | Irgafos 168 | BASF SE, Germany |

3. Examples and Comparative Examples

3.1 General Production Specifications for the Copolyamides According to the Invention The production of the transparent copolyamides according to the invention is effected in a manner known per se in known, agitatable pressure autoclaves with a receiving flask and a reaction vessel:

in the receiving flask, deionised water is placed and the monomers and some additives are added. Thereafter, the solution is made inert several times with nitrogen gas. With agitation, heating takes place to 180 to 230° C. under adjusting pressure in order to obtain a homogeneous solution. This solution is pumped into the reaction vessel through a sieve and is heated there to the desired reaction temperature of 260 to 330° C. at a pressure of at most 30 bar. The batch is retained in the pressure phase for 2 to 4 hours at the reaction temperature. In the subsequent pressure-reduction phase, the pressure is reduced to atmospheric pressure within 1 to 2 hours, the temperature being able to drop slightly. In the subsequent degassing phase, the batch is retained at atmospheric pressure for 0.5 to 2.5 hours at a temperature of 270 to 330° C. The polymer melt is discharged in strand form, cooled in the water bath at 15 to 80° C. and granulated. The granulate is dried at 80 to 120° C. under nitrogen or in a vacuum to a water content of less than 0.1% by weight.

Suitable catalysts for accelerating the polycondensation reaction are phosphorus-containing acids, such as for example $H_3PO_2$, $H_3PO_3$, $H_3PO_4$, the salts or organic derivatives thereof. The catalysts are added in the range of 0.01 to 0.5% by weight, preferably 0.03 to 0.1% by weight, relative to the polyamide.

Suitable defoamers for avoiding foam formation during the degassing are aqueous 10% emulsions which comprise silicones or silicone derivatives and are used in quantities of 0.01 to 1.0% by weight, preferably 0.01 to 0.10% by weight, relative to the polyamide.

3.2 General Production Specifications for the Polyamide Moulding Compounds

For production of the polyamide moulding compound according to the invention, components a) and b) and possibly c) and d) are mixed on normal compounding machines, such as e.g. single or twin-screw extruders or screw kneaders. The components are thereby metered, individually via gravimetric metering scales, into the feed or respectively into a side feeder or supplied in the form of a dry blend. Component b) (glass filler) is preferably metered into the polymer melt via a side feeder.

If additives (component d) are used, these can be introduced directly or in the form of a master batch. The carrier material of the master batch preferably concerns a polyamide or a polyolefin. Amongst the polyamides, in particular the polyamide of the respective components a), PA 6, PA 11, PA 12, PA 69, PA 6/69, or PA 6/12 are suitable.

For the dry blend production, the dried granulate of component a) and possibly components b) to d) are mixed in a closed container. This mixture is homogenised for 10 to 40 minutes by means of a tumble mixer, eccentric wheel mixer or tumble drier. In order to avoid absorption of moisture, this can be effected under dry protective gas.

The compounding is effected at set cylinder temperatures of 250 to 320° C., the temperature of the first cylinder being able to be adjusted below 100° C. A vacuum can be applied in front of the nozzle or atmospheric degassing can take place. The melt is discharged in strand form, cooled in the water bath at 10 to 80° C. and subsequently granulated. The granulate is dried at 80 to 120° C. under nitrogen or in a vacuum to a water content of below 0.1% by weight.

The processing of the polyamide moulding compounds according to the invention by injection moulding is effected with cylinder temperatures of 250 to 320° C., a temperature profile which increases and decreases from the feed to the nozzle being able to be used. The mould temperature is adjusted to a temperature of 60 to 140° C., preferably 70 to 120° C.

3.3 Production of the Copolyamide Used in Examples 4, 5, 7 and 9

Subsequently, the production of a copolyamide according to the invention is explained with reference to the PA 6I/6T/MACMI/MACMT/PACMI/PACMT/12 used in examples 4, 5, 7 and 9:

in the receiving flask of a 300 l pressure autoclave, 35 kg of deionised water was placed and 25.34 kg of isophthalic acid, 25.34 kg of terephthalic acid and 18.62 kg of laurinlactam were stirred in. Thereafter, 31.10 kg of bis(3-methyl-4-aminocyclohexyl)methane (MACM), 18.91 kg of 1,6-hexanediamine, 1.20 kg of bis(4-aminocyclohexyl)methane (PACM), 72 g of phosphinic acid (50% by weight of aqueous solution) as condensation catalyst, 35 g of Antifoam RD 10% by weight of emulsion as defoamer, 12 g of Irganox 1098 as antioxidant, and finally 520 g of benzoic acid as chain regulator were added. Thereupon the process took place as follows:

after being made inert 10 times, heating to 190° C. took place. The homogeneous solution was pumped into the reaction vessel at 190° C. through a sieve.

with agitation, the batch was heated there to 290° C. and held in the pressure phase for 4 hours at 20 bar. Within 2.5 hours, pressure-reduction to atmospheric pressure took place and subsequently degassing for 2 hours at 290° C.

the polymer melt was discharged, cooled in the water bath (20° C.) and granulated. The granulate was dried at 90° C. in a vacuum (30 mbar) to a water content of below 0.1% by weight.

The relative viscosity of the product was 1.58, the glass transition temperature 177° C.

3.4 Production of the Polyamide Moulding Compound of Example 5, Table 4

The dried granulate of copolyamide a) PA 6I/6T/MACMI/MACMT/PACMI/PACMT/12 (76.65% by weight, including the additives contained therein, as indicated under 3.3) was mixed with antioxidants 1 and 2 (0.25% by weight and 0.1% by weight) and with the laurinlactam (3% by weight) to form a dry blend. This mixture (40 kg) was homogenised for approx. 20 minutes by means of a tumble mixer.

The polyamide moulding compound was produced on a twin-screw extruder of the company Werner & Pfleiderer type ZSK 25. The dry blend (80% by weight) was thereby metered into the feed via metering scales. The glass fibre (20% by weight)—component b)—was conveyed into the melt via a side feeder 6 housing units in front of the nozzle.

The temperature of the first housing was adjusted to 70° C., that of the remaining housings to 290 to 310° C. A speed of rotation of 200 rpm and a throughput of 15 kg/h was used and degassing in the nitrogen flow took place in the third zone in front of the nozzle. The polyamide moulding compound discharged as strand was cooled in the water bath at 80° C., granulated and the obtained granulate was dried at 90° C. in a vacuum at 30 mbar to a water content of below 0.1% by weight.

During production of the polyamide moulding compound of example 7, table 4, the process took place correspondingly, however also 3.85% by weight of polyamide 12 was added to the dry blend at the expense of the proportion of copolyamide a).

3.5 Results

The following tables 4 to 6 relate to examples according to the present invention and tables 7 to 11 show comparative examples. For components b) to c), quantity data respectively in percent by weight were given in the tables, the additives d) are dealt with in the text below.

The polyamide moulding compounds were supplemented with a copolyamide a) according to the present invention (tables 4 to 6) or with various blends of polyamides 1, 2 and 3 (tables 8 to 11) so that the total weight of the polyamide moulding compound produced 100% by weight. Table 4 contains a line which indicates the ratio of the monomers of polyamide 1 and polyamide 2 in the copolyamide and tables 5 and 6 respectively contain a line which indicates the ratio of the monomers of polyamide 1 and polyamide 3 in the copolyamide. This ratio was indicated in order to enable easier comparability with the comparative examples which relate partially to blends of polyamides 1 and 2 or 1 and 3.

However, the copolyamides, as indicated above, were obtained by conversion of the monomers in the quantities indicated in the tables.

The copolyamides of examples 1 to 22 of tables 4 to 6 contain 0.03% by weight of phosphinic acid (CAS No. 6303-21-5, manufacturer Honeywell Specialty Chemicals, Germany) as condensation catalyst, 0.03% by weight of Antifoam RD 10% by weight of emulsion (CAS No. 9004-62-0, manufacturer Dow Corning S:A, Belgium) as defoamer and 0.01% by weight of Irganox 1098 as antioxidant, the quantity data relating to the copolyamide.

During compounding of the copolyamides to form the polyamide moulding compounds of examples 1 to 22, in addition to the components listed in tables 4 to 6, also Irganox 1098 and Irgafos 168 are added as antioxidants and in fact at 0.25% by weight and at 0.1% by weight, relative to the polyamide moulding compound.

The polyamide moulding compounds of comparative examples 29 to 54 contain, in addition to the components listed in tables 8 to 11, also, as antioxidant 1, Irganox 1098 at 0.25% by weight and, as antioxidant 2, Irgafos 168 at 0.1% by weight, relative to the polyamide moulding compound.

TABLE 4

Examples with copolyamides made of the monomers of polyamides 1 and 2.

| | Component | Unit | 1 | 2 | 3 | 4 | 5 | 6 | 7 | 8 | 9 |
|---|---|---|---|---|---|---|---|---|---|---|---|
| | Ratio of the monomers made of polyamide 1 and polyamide 2 in the copolyamide | — | 75:25 | 70:30 | 65:35 | 60:40 | 60:40 | 65:35 | 60:40 | 65:35 | 60:40 |
| a) | 1,6-hexanediamine | % by mol | 9.75 | 11.7 | 13.65 | 15.6 | 15.6 | 13.65 | 15.6 | 13.65 | 15.6 |
| | Bis(4-amino-3-methyl-cyclohexyl)-methane | % by mol | 30.28 | 28.73 | 27.185 | 25.64 | 25.64 | 27.185 | 25.64 | 27.185 | 25.64 |
| | Bis(4-amino-cyclohexyl)-methane | % by mol | 0.62 | 0.75 | 0.875 | 1.0 | 1.0 | 0.875 | 1.0 | 0.875 | 1.0 |
| | Isophthalic acid | % by mol | 20.325 | 20.59 | 20.855 | 21.12 | 21.12 | 20.855 | 21.12 | 20.855 | 21.12 |
| | Terephthalic acid | % by mol | 20.325 | 20.59 | 20.855 | 21.12 | 21.12 | 20.855 | 21.12 | 20.855 | 21.12 |
| | Laurinlactam | % by mol | 18.7 | 17.64 | 16.58 | 15.52 | 15.52 | 16.58 | 15.52 | 16.58 | 15.52 |
| b) | Glass fibre 1 | % by wt | 20 | 20 | 20 | 20 | 20 | 20 | 20 | — | — |
| b) | Glass fibre 2 | % by wt | — | — | — | — | — | — | — | 20 | 20 |
| c) | Polyamide 12 | % by wt | — | — | — | — | — | 3.85 | 3.85 | 3.85 | 3.85 |
| c) | Laurinlactam | % by wt | — | — | — | — | 3 | 3 | 3 | 3 | 3 |
| | Measured values | | | | | | | | | | |
| — | Haze | % | 59 | 49 | 40 | 39 | 34 | 33 | 27 | 33 | 36 |
| — | Light transmission | % | 76 | 81 | 83 | 83 | 85 | 86 | 86 | 79 | 84 |
| — | Modulus of elasticity in tension | MPa | 6,480 | 6,730 | 6,830 | 6,830 | 6,790 | 7,010 | 6,700 | 6,900 | 6,800 |
| — | Tearing strength | MPa | 126 | 131 | 127 | 133 | 133 | 132 | 132 | 142 | 142 |
| — | Breaking elongation | % | 2.8 | 2.8 | 2.5 | 2.6 | 2.7 | 2.5 | 2.6 | 2.7 | 2.9 |
| — | Impact strength Charpy 23° C. | kJ/m$^2$ | 29 | 29 | 28 | 29 | 38 | 34 | 36 | 37 | 38 |
| — | Notch impact strength Charpy 23° C. | kJ/m$^2$ | 7.4 | 8.2 | 7.8 | 8.0 | 8.2 | 9.1 | 8.7 | 9.2 | 9.0 |

TABLE 5

Examples with copolyamides made of the monomers of polyamides 1 and 3.

| Com-ponent | | Unit | Examples 10 | 11 | 12 | 13 | 14 | 15 | 16 | 17 |
|---|---|---|---|---|---|---|---|---|---|---|
| — | Ratio of the monomers made of polyamide 1 and polyamide 3 in the copolyamide | — | 75:25 | 70:30 | 75:25 | 70:30 | 65:35 | 60:40 | 60:40 | 55:45 |
| a) | 1,6-hexanediamine | % by mol | 12.5 | 15.0 | 12.5 | 15.0 | 17.5 | 20.0 | 20.0 | 22.5 |
| | Bis(4-amino-3-methyl-cyclohexyl)methane | % by mol | 28.5 | 26.6 | 28.5 | 26.6 | 24.7 | 22.8 | 22.8 | 20.9 |
| | Isophthalic acid | % by mol | 22.59 | 23.305 | 22.59 | 23.305 | 24.0225 | 24.74 | 24.74 | 25.4575 |
| | Terephthalic acid | % by mol | 18.49 | 18.295 | 18.49 | 18.295 | 18.1775 | 18.06 | 18.06 | 17.9425 |
| | Laurinlactam | % by mol | 18.0 | 16.8 | 18.0 | 16.8 | 15.6 | 14.4 | 14.4 | 13.2 |
| b) | Glass fibre 1 | % by wt | 20 | 20 | — | — | — | — | — | — |
| b) | Glass fibre 2 | % by wt | — | — | 20 | 20 | 20 | 20 | — | — |
| b) | Glass fibre 3 | % by wt | — | — | — | — | — | — | 20 | 20 |
| | Measured values | | | | | | | | | |
| — | Haze | % | 35 | 30 | 40 | 39 | 41 | 42 | 47 | 48 |
| — | Light transmission | % | 85 | 86 | 85 | 82 | 82 | 83 | 82 | 81 |
| — | Modulus of elasticity in tension | MPa | 6,110 | 6,330 | 6,410 | 6,900 | 7,130 | 7,110 | 6,570 | 6,670 |
| — | Tearing strength | MPa | 123 | 123 | 139 | 140 | 144 | 140 | 134 | 145 |
| — | Breaking elongation | % | 2.9 | 2.7 | 3.4 | 2.8 | 2.9 | 2.6 | 3.0 | 3.1 |
| — | Impact strength Charpy 23° C. | kJ/m$^2$ | 30 | 30 | 37 | 39 | 38 | 35 | 38 | 36 |
| — | Notch impact strength Charpy 23° C. | kJ/m$^2$ | 7.5 | 7.4 | 8.6 | 9.7 | 9.3 | 9.8 | 7.2 | 7.4 |

TABLE 6

Examples with copolyamides made of the monomers of polyamides 1 and 3.

| | Component | Unit | Examples 18 | 19 | 20 | 21 | 22 |
|---|---|---|---|---|---|---|---|
| — | Ratio of the monomers made of polyamide 1 and polyamide 3 in the copolyamide | — | 70:30 | 75:25 | 70:30 | 75:25 | 70:30 |
| a) | 1,6-hexanediamine | % by mol | 15.0 | 12.5 | 15.0 | 12.5 | 15.0 |
| | Bis(4-amino-3-methyl-cyclohexyl)-methane | % by mol | 26.6 | 28.5 | 26.6 | 28.5 | 26.6 |
| | Isophthalic acid | % by mol | 23.305 | 22.59 | 23.305 | 22.59 | 23.305 |
| | Terephthalic acid | % by mol | 18.295 | 18.49 | 18.295 | 18.49 | 18.295 |
| | Laurinlactam | % by mol | 16.8 | 18.0 | 16.8 | 18.0 | 16.8 |
| b) | Glass fibre 1 | % by wt | 20 | 20 | 20 | — | — |
| b) | Glass fibre 2 | % by wt | — | — | — | 20 | 20 |
| c) | Polyamide 12 | % by wt | — | 3.85 | 3.85 | 3.85 | 3.85 |
| c) | Laurinlactam | % by wt | 3 | 3 | 3 | 3 | 3 |
| | Measured values | | | | | | |
| — | Haze | % | 28 | 33 | 27 | 37 | 39 |

TABLE 6-continued

Examples with copolyamides made of the monomers of polyamides 1 and 3.

| Component | | Unit | Examples | | | | |
|---|---|---|---|---|---|---|---|
| | | | 18 | 19 | 20 | 21 | 22 |
| — | Light transmission | % | 86 | 87 | 86 | 84 | 83 |
| — | Modulus of elasticity in tension | MPa | 6,800 | 6,830 | 6,870 | 6,870 | 7,030 |
| — | Tearing strength | MPa | 130 | 136 | 131 | 142 | 144 |
| — | Breaking elongation | % | 2.6 | 2.7 | 2.5 | 2.8 | 2.8 |
| — | Impact strength Charpy 23° C. | kJ/m$^2$ | 32 | 36 | 39 | 37 | 37 |
| — | Notch impact strength Charpy 23° C. | kJ/m$^2$ | 8.2 | 8.9 | 8.5 | 8.8 | 9.1 |

TABLE 7

Comparative examples with polyamide 1, polyamide 2 or polyamide 3 and glass fibres.

| | Unit | Comparative examples | | | | | |
|---|---|---|---|---|---|---|---|
| | | 23 | 24 | 25 | 26 | 27 | 28 |
| Components | | | | | | | |
| Polyamide 1 | % by wt | 80 | — | — | 80 | — | — |
| Polyamide 2 | % by wt | — | 80 | — | — | 80 | — |
| Polyamide 3 | % by wt | — | — | 80 | — | — | 80 |
| Glass fibre 1 | % by wt | 20 | 20 | 20 | — | — | — |
| Glass fibre 2 | % by wt | — | — | — | 20 | 20 | 20 |
| Measured values | | | | | | | |
| Haze | % | 91 | 81 | 97 | 94 | 84 | 98 |
| Light transmission | % | 86 | 86 | 81 | 85 | 85 | 84 |

TABLE 8

Comparative examples with blends made of polyamide 1 and polyamide 2.

| | Unit | Comparative examples | | | | | |
|---|---|---|---|---|---|---|---|
| | | 29 | 30 | 31 | 32 | 33 | 34 |
| Components | | | | | | | |
| Weight ratio polyamide 1:polyamide 2 | — | 70:30 | 65:35 | 60:40 | 60:40 | 55:45 | 50:50 |
| Glass fibre 1 | % by wt | 20 | 20 | 20 | — | — | — |
| Glass fibre 2 | % by wt | — | — | — | 20 | 20 | 20 |
| Measured values | | | | | | | |
| Haze | % | 88 | 91 | 94 | 93 | 95 | 96 |
| Light transmission | % | 47 | 45 | 41 | 41 | 40 | 39 |
| Modulus of elasticity in tension | MPa | 6,680 | 6,800 | 6,890 | 6,960 | 7,020 | 7,210 |
| Tearing strength | MPa | 131 | 135 | 136 | 149 | 151 | 152 |
| Breaking elongation | % | 2.7 | 2.6 | 2.7 | 3.1 | 3.1 | 3.1 |
| Impact strength Charpy 23° C. | kJ/m$^2$ | 26 | 26 | 24 | 43 | 40 | 44 |
| Notch impact strength Charpy 23° C. | kJ/m$^2$ | 7.6 | 7.9 | 8.2 | 8.5 | 8.5 | 9.6 |

TABLE 9

Comparative examples with blends made of polyamide 1, polyamide 2, polyamide 12 and laurinlactam.

| | | Comparative examples | | | | | |
|---|---|---|---|---|---|---|---|
| | Unit | 35 | 36 | 37 | 38 | 39 | 40 |
| Components | | | | | | | |
| Weight ratio polyamide 1:polyamide 2 | — | 70:30 | 65:35 | 60:40 | 60:40 | 55:45 | 50:40 |
| Glass fibre 1 | % by wt | 20 | 20 | 20 | — | — | — |
| Glass fibre 2 | % by wt | — | — | — | 20 | 20 | 20 |
| Polyamide 12 | % by wt | 3.85 | 3.85 | 3.85 | 3.85 | 3.85 | 3.85 |
| Laurinlactam | % by wt | 3.0 | 3.0 | 3.0 | 3.0 | 3.0 | 3.0 |
| Measured values | | | | | | | |
| Haze | % | 99 | 100 | 100 | 100 | 100 | 100 |
| Light transmission | % | 42 | 40 | 39 | 37 | 36 | 34 |

TABLE 10

Comparative examples with blends made of polyamide 1 and polyamide 3.

| | | Comparative examples | | | | | | |
|---|---|---|---|---|---|---|---|---|
| | Unit | 41 | 42 | 43 | 44 | 45 | 46 | 47 |
| Components | | | | | | | | |
| Weight ratio polyamide 1:polyamide 3 | — | 75:25 | 70:30 | 65:35 | 70:30 | 65:35 | 60:40 | 55:45 |
| Glass fibre 1 | % by wt | 20 | 20 | 20 | — | — | — | — |
| Glass fibre 2 | % by wt | — | — | — | 20 | 20 | 20 | 20 |
| Measured values | | | | | | | | |
| Haze | % | 99 | 100 | 100 | 100 | 100 | 100 | 100 |
| Light transmission | % | 36 | 32 | 30 | 33 | 29 | 27 | 26 |
| Modulus of elasticity in tension | MPa | 6,660 | 6,890 | 6,950 | 6,870 | 7,010 | 7,160 | 7,260 |
| Tearing strength | MPa | 127 | 131 | 133 | 143 | 147 | 152 | 153 |
| Breaking elongation | % | 2.5 | 2.5 | 2.5 | 2.9 | 2.9 | 2.9 | 2.9 |
| Impact strength Charpy 23° C. | kJ/m$^2$ | 37 | 27 | 27 | 33 | 32 | 36 | 34 |
| Notch impact strength Charpy 23° C. | kJ/m$^2$ | 9.0 | 8.4 | 8.8 | 8.7 | 8.5 | 8.7 | 9.3 |

TABLE 11

Comparative examples with blends made of polyamide 1, polyamide 3, polyamide 12 and laurinlactam.

| | | Comparative examples | | | | | | |
|---|---|---|---|---|---|---|---|---|
| | Unit | 48 | 49 | 50 | 51 | 52 | 53 | 54 |
| Components | | | | | | | | |
| Weight ratio polyamide 1:polyamide 3 | — | 75:25 | 70:30 | 65:35 | 70:30 | 65:35 | 60:40 | 55:45 |
| Glass fibre 1 | % by wt | 20 | 20 | 20 | — | — | — | — |
| Glass fibre 2 | % by wt | — | — | — | 20 | 20 | 20 | 20 |

TABLE 11-continued

Comparative examples with blends made of polyamide 1, polyamide 3, polyamide 12 and laurinlactam.

| | Unit | Comparative examples | | | | | | |
|---|---|---|---|---|---|---|---|---|
| | | 48 | 49 | 50 | 51 | 52 | 53 | 54 |
| Polyamide 12 | wt % by wt | 3.85 | 3.85 | 3.85 | 3.85 | 3.85 | 3.85 | 3.85 |
| Laurinlactam | % by wt | 3.0 | 3.0 | 3.0 | 3.0 | 3.0 | 3.0 | 3.0 |
| Measured values | | | | | | | | |
| Haze | % | 100 | 100 | 100 | 100 | 100 | 100 | 100 |
| Light transmission | % | 34 | 33 | 32 | 32 | 29 | 29 | 29 |

Table 12 proves that the monomer proportions indicated in tables 4 to 6 for copolyamides a) actually correspond to the blend ratios between polyamides 1 and 2 or 1 and 3.

MACMI, MACMT, PACMI, PACMT and 12 are thereby linked together in statistical arrangement.

TABLE 12

Calculation of the monomer proportions in the copolyamide made from the blend ratio.

| | Repetition units [% by mol] | | | | | | |
|---|---|---|---|---|---|---|---|
| | 6I | 6T | MACMI | MACMT | PACMI | PACMT | 12[a] |
| Component | | | | | | | |
| Polyamide 1 | — | 38 | 38 | — | — | — | 24 |
| Polyamide 2 | 39 | 39 | 7.1 | 7.1 | 2.5 | 2.5 | 2.8 |
| Polyamide 3 | 66.7 | 33.3 | — | — | — | — | — |
| Blend ratio polyamide 1:2 = 60:40 parts by wt | | | | | | | |
| 60 parts by wt of polyamide 1 | — | — | 22.8 | 22.8 | — | — | 14.4 |
| 40 parts by wt of polyamide 2 | 15.6 | 15.6 | 2.84 | 2.84 | 1.0 | 1.0 | 1.12 |
| Copolyamide | 15.6 | 15.6 | 25.64 | 25.64 | 1.0 | 1.0 | 15.52 |

| Monomer | Monomers [% by mol] | | | | | |
|---|---|---|---|---|---|---|
| proportions | 6 | MACM | PACM | I | T | 12[a] |
| Copolyamide | 15.6 | 25.64 | 1.0 | 21.12 | 21.12 | 15.52 |

| Blend ratio polyamide 1:3 = 70:30 parts by wt | Repetition units [% by mol] | | | | | | |
|---|---|---|---|---|---|---|---|
| | 6I | 6T | MACMI | MACMT | PACMI | PACMT | 12[a] |
| 70 parts by wt of polyamide 1 | — | — | 26.6 | 26.6 | — | — | 16.8 |
| 30 parts by wt of polyamide 3 | 20.01 | 9.99 | — | — | — | — | — |
| Copolyamide | 20.01 | 9.99 | 26.6 | 26.6 | — | — | 16.8 |

| Monomer | Monomers [% by mol] | | | | | |
|---|---|---|---|---|---|---|
| proportions | 6 | MACM | PACM | I | T | 12[a] |
| Copolyamide | 15.0 | 26.6 | — | 23.305 | 18.295 | 16.8 |

[a]12 = laurinlactam.

Table 12 shows, in the first part, the compositions of polyamides 1, 2 and 3 used in the comparative examples in % by mol per repetition unit. The repetition units 6I, 6T, In the second part of table 12, the proportion of repetition units in % by mol in the corresponding copolyamide is calculated from the blend ratio 60:40 of polyamide 1:polyamide 2.

The third part of table 12 indicates the composition resulting from the proportion of repetition units in % by mol per monomer (1,6-hexanediamine (6), bis(4-amino-3-methylcyclohexyl)methane (MACM), bis(4-aminocyclohexyl)methane (PACM), isophthalic acid (I), terephthalic acid (T) and laurinlactam (12)) of the corresponding copolyamide.

The fourth and fifth part of table 12 contain the corresponding data for the blend ratio 70:30 of polyamide 1:polyamide 3.

4. Discussion of the Results

It can be deduced from tables 4 to 6 that all the polyamide moulding compounds according to examples 1 to 22 according to the invention have a haze of less than 70% and a light transmission of greater than 75%. Table 7 shows that polyamide moulding compounds, which comprise polyamides 1 to 3, in fact likewise have good light transmission but the haze is very high and is throughout above 80%. Tables 8 to 11 show polyamide moulding compounds which comprise blends of polyamide moulding compounds 1 to 3. For these polyamide moulding compounds according to the comparative examples 29 to 54, low values for the light transmission and also high values for the haze are obtained throughout.

For example, example 2 according to the invention can be compared directly with comparative example 29. The copolyamide according to example 2 has the same monomers in the same quantities as a blend of polyamides 1 and 2 according to comparative example 29. The content of glass filler and the type of glass filler are likewise identical in both polyamide moulding compounds. Nevertheless, the values for the light transmission (E2: 81% relative to CE29: 47%) and the haze (E2: 49% and E29: 88%) differ hugely. Similarly clear differences result from a comparison of example 3 (light transmission: 83%, haze: 40%) with comparative example 30 (light transmission: 45%, haze: 91%) or example 4 (light transmission: 83%, haze: 39%) with comparative example 31 (light transmission: 41%, haze: 94%).

By using a single amorphous copolyamide, polyamide moulding compounds reinforced with glass fillers can surprisingly be obtained, which compounds also have a high light transmission in addition to low haze.

Furthermore, it can be deduced for example from table 4 that the addition of small quantities of laurinlactam and/or polyamide 12 to the polyamide moulding compounds likewise has a positive influence on the optical properties of the polyamide moulding compound. This can be deduced, for example, from a comparison of examples 4 (comprises neither polyamide 12 nor laurinlactam, light transmission: 83%, haze: 40%), 5 (comprises laurinlactam, light transmission: 83%, haze: 39%) and 6 (comprises polyamide 12 and laurinlactam, light transmission: 85%, haze: 34%).

The invention claimed is:

1. A polyamide moulding compound comprising the following components:
   a) 50 to 95% by weight of a single amorphous copolyamide, constructed from the following monomers,
      a1) 18.5 to 30% by mol of at least one diamine selected from the group consisting of bis(4-amino-3-methylcyclohexyl)methane, bis(4-aminocyclohexyl)methane, bis(4-amino-3-ethylcyclohexyl)methane, bis(4-amino-3,5-dimethylcyclohexyl)methane, 2,2-bis(p-aminocyclohexyl)propane and mixtures thereof,
      a2) 11 to 22% by mol of 1,6-hexanediamine,
      a3) 20.25 to 26% by mol of isophthalic acid,
      a4) 18 to 22% by mol of terephthalic acid,
      a5) 13 to 19% by mol of laurinlactam, and
      a6) 0 to 15% by mol of a1) to a5) of further monomers different from a1) to a5),
      the molar content of isophthalic acid a3) being at least equal to the content of terephthalic acid a4),
      and
      the sum of the monomers a1) to a6) being 100% by mol, and
      the sum of all the diamine monomers corresponding essentially to the sum of all the dicarboxylic acid monomers,
   b) 5 to 50% by weight of at least one glass filler,
   c) 0 to 15% by weight of at least one monomeric lactam and/or polyamide 12,
   d) 0 to 19% by weight of additives,
   the sum of components a) to d) being 100% by weight.

2. The polyamide moulding compound according to claim 1, wherein the haze of the polyamide moulding compound, which is measured according to ASTM D1003 on a moulded article produced from the polyamide moulding compound 2 mm thick plates with width and length: 60×60 mm, is lower by at least 15% than the haze of a further polyamide moulding compound which, with respect to type and quantity of components a) to d) and optional further components, has no differences relative to the polyamide moulding compound, but differs in that the monomers a1) to a6) do not exactly form a single copolyamide but rather a blend of one or more polyamides and/or of one or more copolyamides formed from these monomers is present.

3. The polyamide moulding compound according to claim 1, wherein the further monomers a6) are selected from the group consisting of meta-xylylenediamine, para-xylylenediamine, linear or branched aliphatic diamines with 6 to 22 carbon atoms, linear or branched aliphatic dicarboxylic acids with 4 to 22 carbon atoms, cycloaliphatic dicarboxylic acids with 6 to 22 carbon atoms, naphthalenedicarboxylic acid, dimeric fatty acids with 36, 44 or 54 carbon atoms, lactams with 4 to 11 carbon atoms or lactams with 13 to 15 carbon atoms, ω-amino acids with 4 to 15 carbon atoms and mixtures thereof.

4. The polyamide moulding compound according to claim 1, wherein the transparency, which is measured according to ASTM D1003 on a moulded article produced from the polyamide moulding compound 2 mm thick plates with width and length: 60×60 mm, is at least 75%, and/or
   the haze, which is measured according to ASTM D1003 on a moulded article produced from the polyamide moulding compound 2 mm thick plates with width and length: 60×60 mm, is at most 70%.

5. The polyamide moulding compound according to claim 1, wherein copolyamide a) is constructed from the following monomers:
   a1) 18.5 to 30% by mol of at least one diamine selected from the group consisting of bis(4-amino-3-methylcyclohexyl)-methane, bis(4-aminocyclohexyl)methane, bis(4-amino-3,5-dimethylcyclohexyl)methane and mixtures thereof,
   a2) 11 to 22% by mol of 1,6-hexanediamine,
   a3) 20.25 to 26% by mol of isophthalic acid,
   a4) 18 to 22% by mol of terephthalic acid, and
   a5) 13 to 19% by mol of laurinlactam.

6. The polyamide moulding compound according to claim 1, wherein copolyamide a) is constructed from the following monomers:
   a1) 18.5 to 30% by mol of bis(4-amino-3-methylcyclohexyl)methane,
   a2) 11 to 22% by mol of 1,6-hexanediamine,
   a3) 18 to 22% by mol of isophthalic acid, a4) 18 to 19% by mol of terephthalic acid, and
a5) 13 to 19% by mol of laurinlactam.

7. The polyamide moulding compound according to claim 1, which consists of components a) to d).

8. The polyamide moulding compound according to claim 1, wherein:
the at least one monomeric lactam according to component c) is caprolactam or laurinlactam, and/or
the polyamide moulding compound comprises 0.1 to 10% by weight, relative to the total weight of the polyamide moulding compound, of laurinlactam in monomeric form as component c), and/or
the polyamide moulding compound comprises 0.1 to 10% by weight, relative to the total weight of the polyamide moulding compound, of polyamide 12 as component c).

9. The polyamide moulding compound according to claim 1, comprising at least one additive.

10. The polyamide moulding compound according to claim 9, wherein the at least one additive is selected from the group consisting of inorganic and organic stabilisers, lubricants, colourants, marking means, pigments, carbon black, graphite, photochromic agents, antistatic agents, mould-release agents, condensation catalysts, chain regulators, defoamers, antiblocking means, optical brighteners, halogen-containing flame retardants, halogen-free flame retardants, natural layer silicates, synthetic layer silicates, metallic pigments, metal flakes, metal-coated particles, fillers, nanoscale fillers with a particle size of at most 100 nm, and mixtures thereof.

11. The polyamide moulding compound according to claim 1, wherein the at least one glass filler b) is selected from the group consisting of fibres, ground fibres, particles, flakes, balls, hollow balls, and mixtures thereof.

12. The polyamide moulding compound according to claim 1, wherein the glass type of glass filler b) is selected from the group consisting of A-glass, C-glass, D-glass, E-glass, ECR-glass, M-glass, R-glass, S-glass, T-glass, and mixtures thereof.

13. The polyamide moulding compound according to claim 1, wherein
the fibres of the glass filler b) are selected from the group consisting of cut fibres, endless fibres and mixtures thereof,
the cut and endless fibres having a cross-section which is round, oval, elliptical, square, or rectangular.

14. The polyamide moulding compound according to claim 1, wherein
the proportion of component a) in the polyamide moulding compound is in the range of 55 to 89.8% by weight, relative to the total weight of the polyamide moulding compound, and/or
the proportion of component b) in the polyamide moulding compound is in the range of 10 to 40% by weight, relative to the total weight of the polyamide moulding compound, and/or
the proportion of component c) in the polyamide moulding compound is in the range of 0.1 to 10% by weight, relative to the total weight of the polyamide moulding compound, and/or
the proportion of component d) in the polyamide moulding compound is in the range of 0.1 to 15% by weight, relative to the total weight of the polyamide moulding compound.

15. The polyamide moulding compound according to claim 1, which
has a tearing strength, determined according to ISO 527, of at least 80 MPa, and/or
has a breaking elongation, determined according to ISO 527, of at least 1.5%, and/or
has a modulus of elasticity in tension, determined according to ISO 527, of at least 4,000 MPa, and/or
has a Charpy impact strength at 23° C., determined according to ISO 179/2eU, of at least 20 kJ/m$^2$, and/or
has a Charpy notch impact strength at 23° C., determined according to ISO 179/2eA, of at least 6.0 kJ/m$^2$.

16. A moulded article produced from the polyamide moulding compound according to claim 1.

17. The moulded article according to claim 16, which is selected from the group consisting of components of mobile phones, tablets, housings of electronic devices, decorative parts in vehicles and the household, covers, visible surfaces, backlit components, screens, containers, vehicle keys, and leisure and outdoor articles.

18. The polyamide moulding compound according to claim 1, wherein the transparency, which is measured according to ASTM D1003 on a moulded article produced from the polyamide moulding compound 2 mm thick plates with width and length: 60×60 mm, is in the range of 76% to 87%, and
the haze, which is measured according to ASTM D1003 on a moulded article produced from the polyamide moulding compound 2 mm thick plates with width and length: 60×60 mm, is in the range of 27% to 49%.

19. The polyamide moulding compound according to claim 1, wherein the transparency, which is measured according to ASTM D1003 on a moulded article produced from the polyamide moulding compound 2 mm thick plates with width and length: 60×60 mm, is in the range of 76% to 87%, and
the haze, which is measured according to ASTM D1003 on a moulded article produced from the polyamide moulding compound 2 mm thick plates with width and length: 60×60 mm, is in the range of 27% to 48%.

* * * * *